Oct. 9, 1928.

H. CAMINEZ 1,687,265

PISTON

Filed April 2, 1927

INVENTOR
Harold Caminez
BY Maréchal and Noe
ATTORNEY

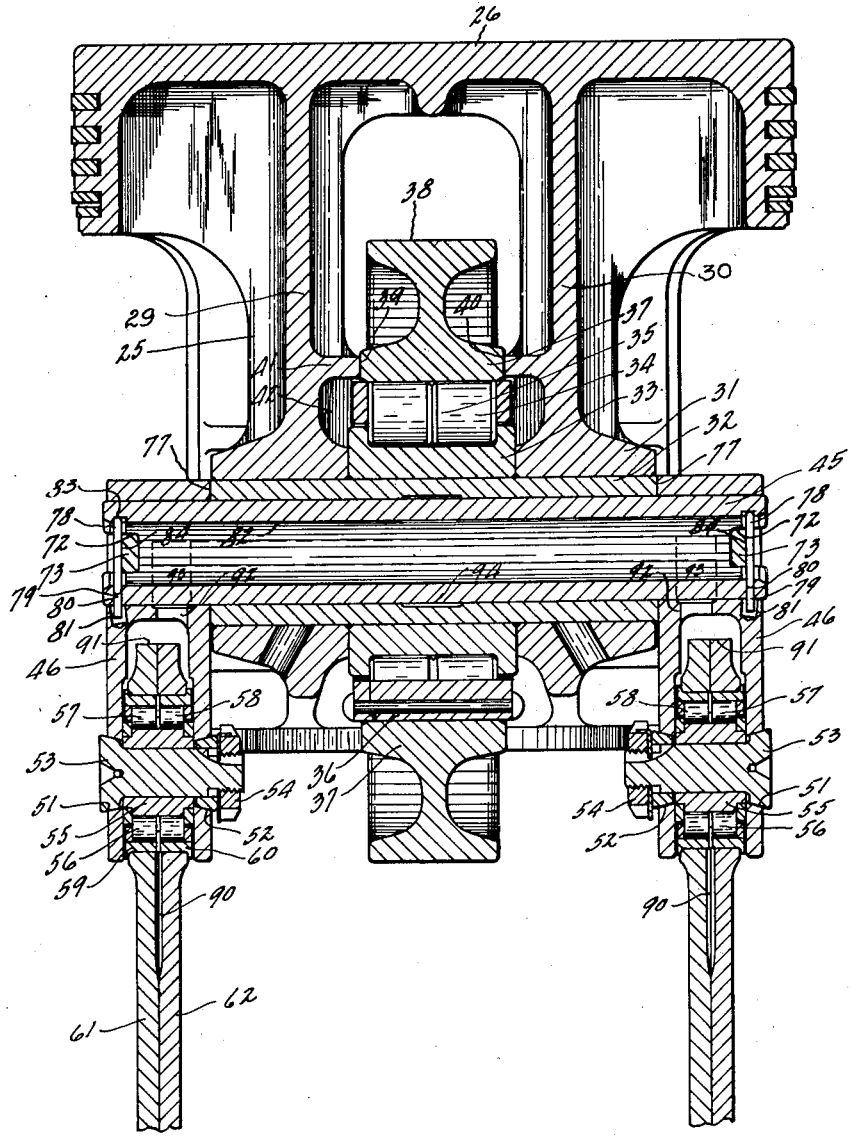

Patented Oct. 9, 1928.

1,687,265

UNITED STATES PATENT OFFICE.

HAROLD CAMINEZ, OF FARMINGDALE, NEW YORK.

PISTON.

Application filed April 2, 1927. Serial No. 180,497.

This invention relates to piston constructions of internal combustion engines and particularly to the type of piston used in internal combustion engines in which the explosive force within the cylinders is caused to be effective upon a central cam to cause a revolution of the drive shaft, the pistons in the cylinders being interconnected so that they are maintained in bearing relation with the cam.

One object of the invention is the provision of a novel piston construction of the character just mentioned which will be strongly constructed yet light in weight and in which the friction of the moving parts will be eliminated to a very large extent.

A further object of the invention is the provision of a piston construction in which the piston pin is provided at each end with a link attaching arm, these arms providing roller bearings upon which the links which couple adjacent pistons together are mounted.

A still further object of the invention resides in the arrangement of the parts which make up the piston assembly so that a proper supply of lubricant is provided for the various moving parts of assembly.

Other objects and advantages of the invention will be apparent from the following description and from the drawings in which:

Fig. 8 is a perspective view of the strap which interconnects the piston pin and a link attaching arm.

Figure 1:
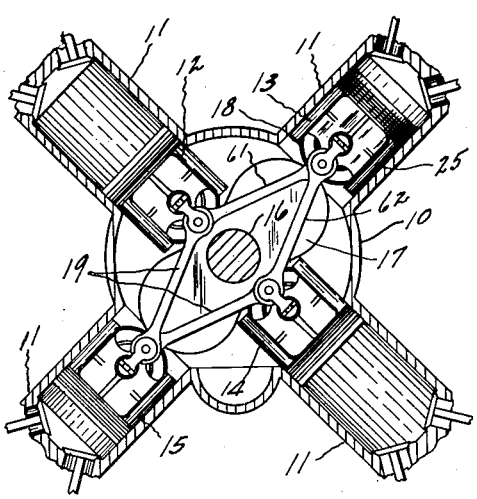
Fig. 1 is a central section through a cam engine which utilizes the present invention.

Referring more particularly to the drawings by reference numerals in which corresponding numerals designate similar parts in the various views, the internal combustion engine designated generally 10 is shown in Fig. 1 as a four cylinder engine having the radially disposed cylinders 11, in each of which is a piston assembly as indicated at 12, 13, 14 and 15. A central shaft 16 is supported in any suitable manner at the center of the engine and carries a double-lobed cam 17 shaped generally in the form of a figure 8. The piston assemblies carry rollers 18 which bear on the periphery of the cam and the explosions in the various cylinders are caused to take place successively so that the piston rollers transmit the force from the piston to the cam and cause the revolution of the shaft 16 on which the cam is fixed. The piston assemblies are interconnected by means of links 19 so that the pistons are caused to be reciprocated in the proper manner and are maintained in bearing relation with the cam. This invention is an improvement upon my prior Patent #1,578,817, granted March 30, 1926.

Figure 2:
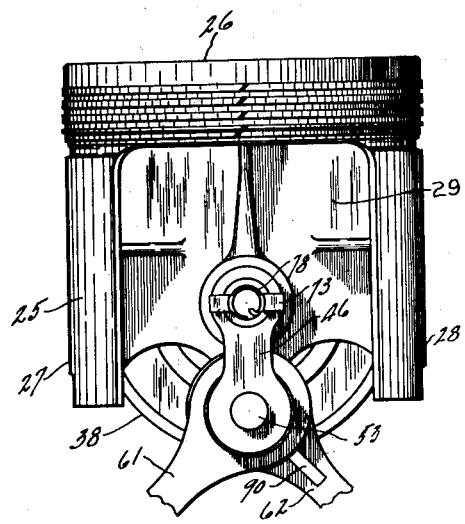
Fig. 2 is a side elevation of a piston assembly of the present invention.

Each piston assembly as shown in Fig. 2 comprises a piston body designated generally 25 having the customary piston head 26 and the piston sides 27 and 28 adapted to cooperate with the engine cylinder. Integral piston web portions 29 and 30 extend downwardly from the piston head and away from the sides 27 and 28 and are enlarged as shown at 31 so as to provide flanged portions within which a bearing sleeve 32 may be mounted. This bearing sleeve is adapted to be pushed in place in the piston by an endwise movement, and the length of this sleeve substantially corresponds with the width of the piston portions in which it is mounted. The sleeve 32 supports the inner race member 33 of a roller bearing 34. This roller bearing is provided with a series of antifriction rollers 35 which are centered by means of the centering cage 36 centered and rotatably mounted within the outer race 37 which forms a part of the roller member 38 which is adapted to contact with the periphery of the cam. The sides of the inner race 33 are neatly received between the two enlargements 31 of the piston webs. The outer race member 37 is held in place centrally on the roller bearing and properly located between the surfaces 39 and 40 of the ridges 41 provided on the piston webs. Oil supplying grooves 42 are defined by the ridges 41 and between the ridges and the rollers of the bearing so that the rollers may receive an adequate supply of lubricant during the rapid oscillation of the piston. It will be apparent that the roller bearing as a whole may be withdrawn from the bottom of the piston after the sleeve 32 has been withdrawn endwise from the piston web portions in which it is mounted.

Oscillatably mounted within the sleeve 32 is a cylindrical piston pin 45 which projects beyond the ends of the sleeve 32 and beyond the side portions of the piston. At each end of the piston pin is an arm 46, see Figs. 4 and 5 to which the links which interconnect the adjacent piston assemblies are connected.

The arm 46 is provided with a cylindrical bearing surface 47 which neatly fits on the end of the piston pin. Depending sides 48 and 49 extend integrally from the bearing portion, and adjacent the lower portons of the sides are the bearing pin receiving holes 50. These are preferably tapered as shown so that they may receive the tapered head 51 and the tapered wedge 52 of the bearing pin 53 which is held firmly in place on the sides of the arm by means of the nut 54 screwed on the threaded end of the bearing pin. On the bearing pin 53 is mounted the inner race 55 of a roller bearing designated generally 56. This roller bearing is provided with two complete sets of anti-friction rollers as indicated at 57 and 58, the sets of rollers being located side by side on the common race 55. Each set of rollers is independently located in a separate cage and these cages are centered in the bushings 59 and 60 which are fixed in the two links 61 and 62 respectively. These links at their other ends are similarly attached to a similar arrangement provided on adjacent pistons, as shown in Fig. 1, and it will be noted that a pair of links is provided adjacent each side of the piston so that the adjacent pistons are interconnected for simultaneous movement in unison and are maintained in bearing relation with the cam, which is properly designed so that its engagement with the various piston assemblies will be properly effected.

Figures 4, 5:
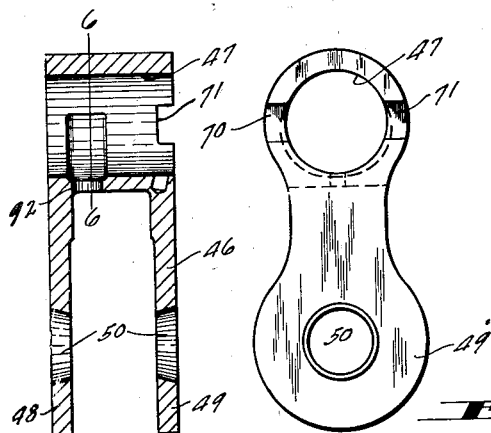
Fig. 4 is a detail view of one of the arms to which the links are connected.
Fig. 5 is an end view of the arm presented in Fig. 4.
Figure 6:
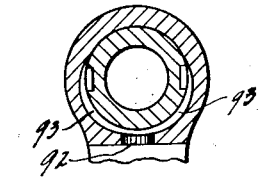
Fig. 6 is a section on the line 6—6 of Fig. 4.
Figure 7:
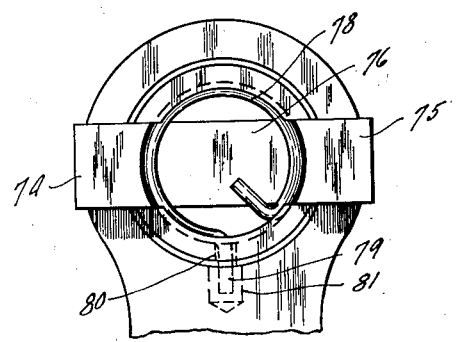
Fig. 7 is an end view showing the manner of connecting the link attaching arm to the piston pin.
Figure 3:
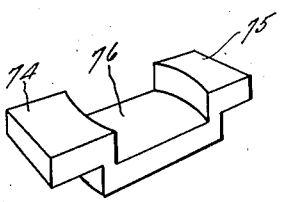
Fig. 3 is a central transverse section through the piston assembly.

As shown in Fig. 5 the link connecting arm 46 is provided with opposed slots 70 and 71, and correspondingly positioned slots 72 are provided in the ends of the piston pins. A tie strap 73 shown in Fig. 8 is provided with end portions 74 and 75 and a center body portion 76 which is offset from the end portions as shown. The end portions 74 and 75 are adapted to be received within the slots 70 or 71 of the link connecting arms and in the opposed slots 72 in the end of the piston pin, so that the arms 46 will be rigidly mounted in place on the ends of the piston pin and held against any rotational movement thereon. The bearing portion 47 of the arms 46 engages against the outer end surface 77 of the sleeve 32 and is held against outward axial movement along the piston pin by means of the tie strap 73 previously mentioned. The tie strap is held in place in its seated relation within the slots on the arm 46 and on the piston pin by means of a retaining spring ring 78. This spring ring as more clearly shown in Fig. 7 has an outwardly bent end portion 79 seated within a small hole 80 in the piston pin and in a registering hole 81 in the arm 46. The ring 77 is of slightly larger diameter than the inner bore 82 of the piston pin so that it will be maintained in a small groove 83 in the inner surface of the pin. This groove 83 is properly positioned from the end of the pin so that the retaining ring will be in engagement with the surface 84 of the tie strap 73. By reason of its expanding action the retaining spring 77 will be held firmly in place and thus lock the tie strap 73 in engagement with the piston pin and with the link connecting arm.

In order to provide the proper lubrication for the various moving parts of the piston assembly the links 61 and 62 are each provided with a groove 90 on the inner end portions of the links. These grooves extend centrally along the ends of the links so that oil which may be supplied to the end portions of the links may find its way along the grooves and between the links, and between the space provided between the two link bushings 59 and 60 to the rollers on which the links are mounted. After insuring the lubrication of these rollers the oil or lubricant will be thrown out past the ends of the links during the rapid reciprocation of the piston assembly and will travel from the point 91 between these links through a passage 92 to a recess or chamber 93 which is provided between the piston pin and the link connecting arms by slightly enlarging a portion of the inner surface of the bearing portion 47 on the arm 46. The lubricant will then find its way from the chamber or recess 93 to provide for the proper lubrication of the piston pin and in order to facilitate this disposition of the oil, spiral channels may be cut in the sleeve 32. The oil will then find its way to a recess portion 94 at the center of the sleeve 32 in which a suitable amount of lubricant will be retained for the proper lubrication of the piston pin.

It will be understood that the construction which has just been described by which a pair of links is connected to the link connecting arm on one end of the piston pin is duplicated in the similar manner on the opposite side of the piston. The links are arranged in pairs with a pair on each side of the piston mounted on a common axis and each capable of movement relatively to the other link of the pair by reason of the individual roller bearing support at the ends of the links. The piston pin together with the link connecting arms which are used at each end of the piston pin will be capable of slight oscillatory movement about the piston pin axis to compensate for any play, lost motion, or elongation of the links during the operation of the engine. The oscillatory movement provided by the arrangement just mentioned prevents the creation of side thrust on the pistons due to the forces acting in the links. All four links connected to any one piston are at all times maintained so that their ends are movable about a common axis below the piston pin center line, and by reason of the interconnection provided between the two opposite link connecting arms, both of which are attached to the piston pin, the connections between the link ends and the connecting arms are restrained to oscillate in exact unison while equalizing the loads on all the links. The pistons are thus prevented from moving or twisting about their central axes, which correspond to the centers of the cylinder bores.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A piston construction of the class described comprising a piston body, a sleeve in said piston body, a piston pin oscillatably mounted in said sleeve, a roller bearing mounted in said piston on said sleeve, said piston having an integral bearing portion through which said sleeve may be inserted endwise and which locates the roller bearing in the center of the piston, and means at the ends of said piston pin for connection to adjacent pistons.

2. A piston construction of the class described comprising a piston, a sleeve in said piston, a piston pin mounted within said sleeve and extending beyond the ends thereof, a roller bearing mounted in said piston on said sleeve, said piston having integral bearing portions through which said sleeve may be inserted endwise, an arm at each end of the piston pin, means for attaching each arm rigidly to the piston pin, and means on each arm adapted to be connected to a pair of links to support said links on a common center below the piston pin axis.

3. A piston construction of the class described comprising a piston, a piston pin mounted in said piston, an arm at each end of said piston pin, slots in said arms and said piston pin, a strap fitting in the slots in each arm and engaging the slots in the piston pin, and strap retaining means engaging the piston pin to hold said straps in place.

4. A piston construction of the class described comprising a piston, a sleeve in said piston, a piston pin oscillatably mounted in said sleeve and extending beyond the ends thereof, a roller bearing mounted on said sleeve within said piston, an arm mounted on each end of said piston pin for connection to adjacent pistons, engaging slots in one end of the piston pin and in one of said arms, a strap engaging said slots, and strap retaining means engaging said piston pin for holding said strap in place, and means for fastening the other of said arms on said piston pin.

5. A piston construction of the class described comprising a piston, a piston pin therefor, an arm mounted on each end of said piston pin, an anti-friction bearing supported on each of said arms, each of said anti-friction bearings having two adjacent sets of rollers, and a pair of adjacent links for each of said arms supported on said sets of rollers for individual movement thereon.

6. A piston construction of the class described comprising a piston, a piston pin therefor, an arm mounted on each end of said piston pin, anti-friction rollers mounted on said arms, a pair of links supported on each arm and mounted on said anti-friction bearings, and means for individually attaching said arms to said piston pin.

7. A piston construction of the class described comprising a piston, a roller bearing supported centrally within said piston, a piston pin projecting beyond the sides of the piston, an arm fixed at each end of said piston pin, a bearing pin in each of said arms, a roller bearing supported on each of said bearing pins and a pair of links mounted on each of said roller bearings, said roller bearings having cages centered in the ends of said links.

8. A piston construction of the class described comprising a piston, a piston pin supported in said piston and projecting beyond the sides thereof, an anti-friction bearing mounted centrally within the piston, an arm at each end of said piston pin, said piston pin and said arms having adjacent slots, a strap for each arm engaging said slots, a spring retaining ring bearing against the outside of each of said straps and supported within the piston pin, a bearing pin for each of said arms, a roller bearing race mounted on each of said pins, two sets of rollers on said race, a pair of links mounted for relative movement on said rollers, and a centering cage for each set of rollers centered within said links.

9. A piston construction of the class described comprising a piston, a piston pin therefor, an arm on each end of said piston pin and means on each arm adapted to be connected to a pair of links to support said links on a common center below the piston pin axis.

10. A piston construction of the class described comprising a piston, a piston pin therefor, an arm at each end of said piston pin, a link attaching means on each of said arms, a pair of adjacent links mounted on a common axis on each of said link attaching means, an oil receiving recess between said piston pin and each of said arms said recess being located substantially in alignment with said links so as to receive oil thrown outwardly from between said links.

11. A piston construction of the class described comprising a piston, a piston pin oscillatably mounted within said piston, an arm attached at each end of said piston pin, roller bearings in said arms, a pair of links concentrically mounted in juxtaposition in each of said arms for relative movement, said links having oil receiving recesses for conducting oil to said roller bearings.

12. A piston construction of the class described comprising a piston, a sleeve in said piston, a piston pin oscillatably mounted within said sleeve and extending beyond the ends of said sleeve and beyond said piston, a roller bearing mounted on said sleeve within the piston, an arm mounted on each end of said piston pin, means for attaching said arms to the piston pin, roller bearings mounted on said arms, a pair of links mounted on each of said arms on said roller bearings said links having oil supply recesses adapted to conduct the oil to the roller bearings on which the links are mounted, and said piston pin and said arms providing an oil chamber therebetween adapted to receive oil from the ends of said links.

In testimony whereof I hereto affix my signature.

HAROLD CAMINEZ.